(12) United States Patent
Kwon

(10) Patent No.: US 10,663,836 B2
(45) Date of Patent: May 26, 2020

(54) PHOTOGRAPHING APPARATUS HAVING LENS ADJUSTMENT PART

(71) Applicant: VIEWORKS CO., LTD., Anyang-si, Gyeonggi-do (KR)

(72) Inventor: Jeong Yong Kwon, Ansan-si (KR)

(73) Assignee: VIEWORKS CO., LTD., Anyang-si, Gyeonggi-do (KR)

( * ) Notice: Subject to any disclaimer, the term of this patent is extended or adjusted under 35 U.S.C. 154(b) by 0 days.

(21) Appl. No.: 16/424,133

(22) Filed: May 28, 2019

(65) Prior Publication Data

US 2019/0361320 A1 Nov. 28, 2019

(30) Foreign Application Priority Data

May 28, 2018 (KR) .................. 10-2018-0060475

(51) Int. Cl.
*G03B 13/32* (2006.01)
*G03B 11/00* (2006.01)
*G02B 7/04* (2006.01)
*H04N 5/225* (2006.01)

(52) U.S. Cl.
CPC ............ *G03B 13/32* (2013.01); *G02B 7/04* (2013.01); *G03B 11/00* (2013.01); *H04N 5/2254* (2013.01)

(58) Field of Classification Search
None
See application file for complete search history.

(56) References Cited

U.S. PATENT DOCUMENTS

| 196,591 | A | * | 10/1877 | Moss | G03B 27/326 355/63 |
|---|---|---|---|---|---|
| 2,312,562 | A | * | 3/1943 | Leonard | G03B 27/326 355/62 |
| 2,326,542 | A | * | 8/1943 | Leonard | G03B 27/326 248/590 |
| 2,388,394 | A | * | 11/1945 | Drucker | G03B 27/326 355/63 |
| 3,677,636 | A | * | 7/1972 | Stein | G03B 27/326 355/18 |
| 4,281,343 | A | * | 7/1981 | Monteiro | H04N 5/2252 348/373 |
| 4,515,468 | A | * | 5/1985 | Taylor | G03B 27/32 355/27 |
| 5,661,541 | A | * | 8/1997 | Frick | G03B 15/003 355/20 |

(Continued)

FOREIGN PATENT DOCUMENTS

| KR | 1020050090803 | | 9/2005 |
|---|---|---|---|
| KR | 100728017 | B1 | 6/2007 |

(Continued)

*Primary Examiner* — William B Perkey
(74) *Attorney, Agent, or Firm* — Rabin & Berdo, P.C.

(57) ABSTRACT

The present invention relates to a photographing apparatus having lens adjustment parts, comprising: a housing in which an object to be photographed is located; a camera located inside the housing to photograph the object; a lens unit having at least one lens knob; at least one link part located inside the housing and coupled to the lens knobs to rotate the lens knobs; a fixing part hingedly coupled to the link parts; and the lens adjustment parts coupled to one end of the link parts in such a manner as to be linearly moved according to a user's adjustment.

14 Claims, 9 Drawing Sheets

(56) References Cited

U.S. PATENT DOCUMENTS

| | | | | |
|---|---|---|---|---|
| 6,783,286 B2 * | 8/2004 | Maeda | ............ | G08B 13/19626 348/143 |
| 2010/0208360 A1 * | 8/2010 | Kuo Hsiu | ................ | G02B 7/10 359/694 |
| 2019/0293919 A1 * | 9/2019 | Hamilton | ................. | G02B 7/04 |

FOREIGN PATENT DOCUMENTS

| KR | 1020110058496 A | 6/2011 |
|---|---|---|
| KR | 101619834 B1 | 5/2016 |

* cited by examiner

PHOTOGRAPHING APPARATUS HAVING LENS ADJUSTMENT PART

BACKGROUND OF THE INVENTION

Cross Reference to Related Application of the Invention

The present application claims the benefit of Korean Patent Application No. 10-2018-0060475 filed in the Korean Intellectual Property Office on May 28, 2018, the entire contents of which are incorporated herein by reference.

Field of the Invention

The present invention relates to a photographing apparatus having lens adjustment parts, and more particularly, to a photographing apparatus having lens adjustment parts that is capable of enlarging and reducing an object to be photographed and adjusting a focus and an aperture of a lens only through control of the lens adjustment parts exposed to the outside thereof, without any movement of a stage or camera or any direct adjustment of the lens.

Background of the Related Art

Molecular images enable phenomena occurring in cells of an object or regulatory mechanisms of a living body to be observable, without any sacrifice of the object, and such molecular images can be useful in observing gene transfer into a living body, endogenous gene expression, pathway tracking of cell injected in the body, intercellular signaling, cell dead, tumor progression, new blood vessel development, and protein-protein interactions in cell, so that they are actively utilized at the time when new foods or medicines are developed.

After a food or medicine to be newly developed is first fed to a small laboratory animal like a laboratory rat, in detail, molecular images are dynamically utilized to check changes in the body of the laboratory animal according to the fed food or medicine. Recently, the molecular images can be rapidly obtained even at a low cost, and in view of the fact that it is possible to obtain the image of the laboratory animal even if radiation like X-rays is not used, the molecular images are obtained generally through an optical imaging system.

In a process of obtaining the molecular images through the optical imaging system, however, there is a need to enlarge or reduce the laboratory animal or to adjust a focus of a lens and an aperture for adjusting a quantity of light, and in conventional practices, as shown in FIGS. 1A and 1B, a height of a camera or a height of a stage on which the laboratory animal is placed is adjusted through an electric motor so as to enlarge the laboratory animal. In this case, however, it is hard to finely adjust the focus of the lens due to different heights of objects to be photographed, and further, a lot of time is consumed for adjusting the lens, thereby making it difficult to quickly obtain the molecular images.

In conventional practice, another method for adjusting the lens is carried out by directly adjusting the lens protrudingly exposed to the outside of a photographing apparatus by a user, but in this case, the lens is attached to the outside of the photographing apparatus, so that it may be absolutely damaged while moving or used.

Like this, the conventional molecular imaging apparatuses have had problems in that it is inconvenient to adjust their lens or their lens may be damaged, and accordingly, there is a definite need to develop a new photographing apparatus capable of allowing a lens to be more conveniently and rapidly controlled by a user, without any damage on the lens, in a process of photographing a molecular image.

SUMMARY OF THE INVENTION

Accordingly, the present invention has been made in view of the above-mentioned problems occurring in the related art, and it is an object of the present invention to provide a photographing apparatus having lens adjustment parts that is capable of enlarging and reducing an object to be photographed and adjusting a focus and an aperture of a lens only through control of the lens adjustment parts exposed to the outside thereof, without any movement of a stage or camera or any direct adjustment of the lens, thereby solving the problems the conventional molecular imaging apparatuses have had.

To accomplish the above-mentioned object, according to the present invention, there is provided a photographing apparatus having lens adjustment parts, including: a housing in which an object to be photographed is located; a camera located inside the housing to photograph the object; a lens unit having at least one lens knob; at least one link part located inside the housing and coupled to the lens knobs to rotate the lens knobs; a fixing part hingedly coupled to the link parts; and the lens adjustment parts coupled to one end of the link parts in such a manner as to be linearly moved according to a user's adjustment, wherein the linear motions of the lens adjustment parts are converted into rotational motions of the lens knobs by means of the link parts coupled to the lens adjustment parts and the lens knobs.

According to the present invention, desirably, the photographing apparatus further includes a casing disposed inside the housing to provide an object photographing space therein.

According to the present invention, desirably, the photographing apparatus further includes a support plate located on the underside of the camera to support the camera.

According to the present invention, desirably, the lens unit includes: the first lens knob for adjusting a focus; the second lens knob for adjusting an aperture; and the third lens knob for enlarging/reducing the object.

According to the present invention, desirably, the photographing apparatus further includes: a first fine knob for finely adjusting the first lens knob; a second fine knob for finely adjusting the second lens knob; and a third fine knob for finely adjusting the third lens knob.

According to the present invention, desirably, the photographing apparatus include: the first link part coupled to the first lens knob; the second link part coupled to the second lens knob; and the third link part coupled to the third lens knob.

According to the present invention, desirably, each link part includes: a ring coupled to the corresponding lens knob; a first link rod whose one end is hingedly coupled to the fixing part and whose other end is coupled to the corresponding lens adjustment part; and a second link rod whose one end is coupled to the ring and whose other end is coupled to the first link rod.

According to the present invention, desirably, each lens adjustment part further includes a bracket coupled to the first link rod in such a manner as to convert the horizontal motion of each lens adjustment part into a rotational motion of the first link rod.

According to the present invention, desirably, the first link rod is rotated through the horizontal motion of each lens adjustment part, and through the rotation of the first link rod, the second link rod is rotated to rotate the ring, so that through the rotation of the ring, the corresponding lens knob is rotated.

According to the present invention, desirably, the photographing apparatus further includes at least one fixing member disposed on the underside of the support plate to fix the lens unit.

According to the present invention, desirably, each fixing member includes a protruding portion protruding therefrom toward the lens unit to prevent the lens unit from being moved.

According to the present invention, desirably, the photographing apparatus further includes a plurality of support rods for supporting the support plate.

According to the present invention, desirably, the photographing apparatus further includes a blocking member disposed on an inner peripheral surface of a lens unit insertion hole formed on the top of the casing to block out an external light source.

According to the present invention, desirably, the blocking member has a shape of a section having crests and roots alternately arranged.

BRIEF DESCRIPTION OF THE DRAWINGS

The above and other objects, features and advantages of the present invention will be apparent from the following detailed description of one of the embodiments of the invention in conjunction with the accompanying drawings, in which.

DETAILED DESCRIPTION OF THE INVENTION

Figure 1A:
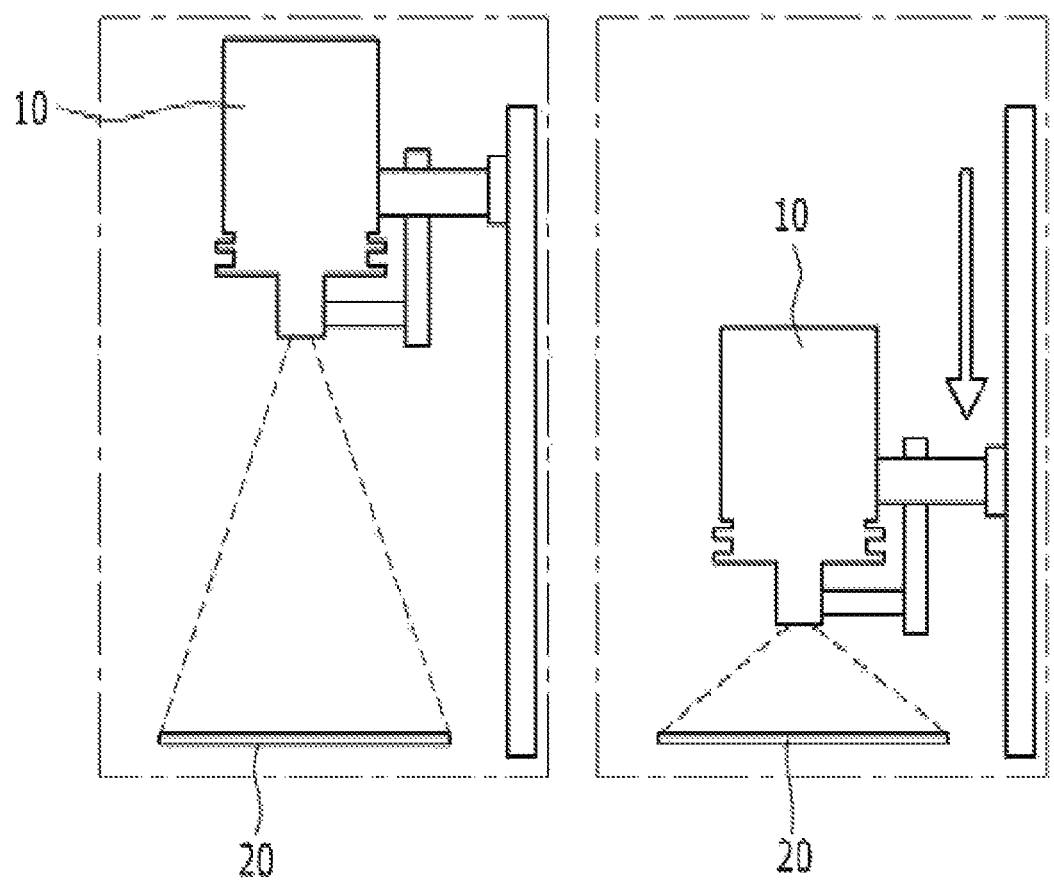
FIGS. 1A and 1B are side views showing a process of adjusting a height of a camera or stage through an electric motor at the time when an image is photographed by a conventional photographing apparatus.

The present invention is disclosed with reference to the attached drawings wherein the corresponding parts in the embodiments of the present invention are indicated by corresponding reference numerals and the repeated explanation on the corresponding parts will be avoided. If it is determined that the detailed explanation on the well known technology related to the present invention makes the scope of the present invention not clear, the explanation will be avoided for the brevity of the description.

When it is said that one element is described as being "connected" or "coupled" to the other element, one element may be directly connected or coupled to the other element, but it should be understood that another element may be present between the two elements. In the description, when it is said that one member is located "above" or "under" another member, it means that one member may come into contact with another member as well as yet another member may exist between the two members.

In this application, terms, such as "comprise", "include", or 'have', are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

Before the present invention will be explained, a method for manipulating a lens unit of a conventional photographing apparatus will be briefly described with reference to FIGS. 1A and 1B.

Figure 1B:
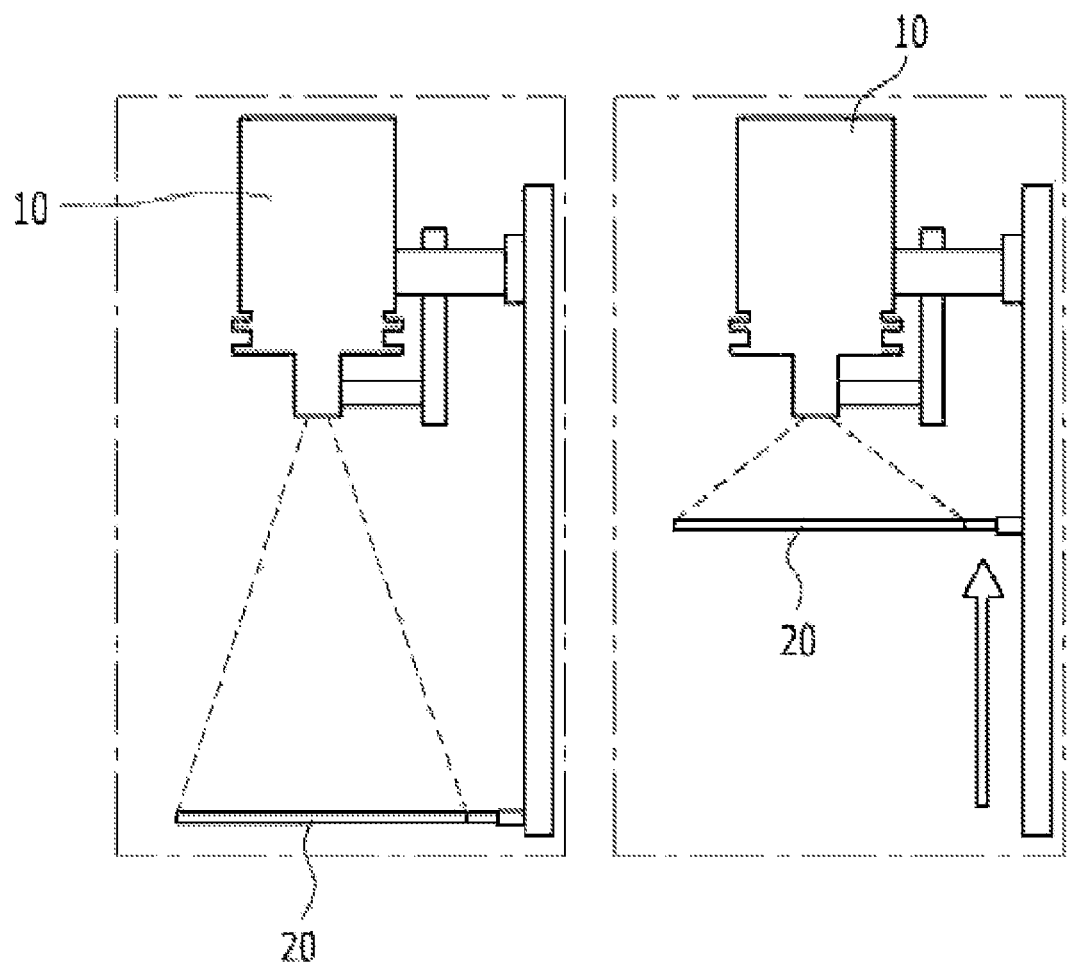

FIGS. 1A and 1B are side views showing a process of adjusting a height of a camera or stage through an electric motor at the time when an image is photographed by a conventional photographing apparatus.

So as to develop a new medicine or food, first, the medicine is injected into an object like a laboratory rat, or the food is fed to the object. Next, changes in the body of the object are (molecular image) photographed through a CCD camera, so that the effects of the medicine or food can be checked on the basis of the photographed image.

So as to obtain a more precise image in the photographing process, the object has to be enlarged or reduced, or a focus, an aperture and so on should be adjusted. In order to enlarge or reduce the object, in the conventional practices, a height of a camera 10 is adjusted through an electric motor, as shown in FIG. 1A, and contrarily, a height of a stage 20 on which the object is placed is adjusted, as shown in FIG. 1B. Otherwise, the focus or aperture is adjusted through a user's direct adjustment of a lens unit exposed to the outside of the photographing apparatus.

In case where the lens unit is adjusted in the conventional practices, however, the time for adjusting the height of the camera or stage is additionally required, so that it is difficult to achieve rapid photographing, and besides, the lens unit has to be adjusted after the photographing has been stopped, so that it is hard to finely adjust the lens unit, which undesirably makes precision in the photographed image deteriorated.

Accordingly, the present invention relates to a photographing apparatus that is capable of enlarging and reducing an object as well as adjusting a focus and an aperture only through the lens adjustment parts disposed on the external surface thereof, without any use of the electric motor or the user's direction adjustment of the lens unit exposed to the outside of the photographing apparatus.

Hereinafter, an explanation on a photographing apparatus having lens adjustment parts according to the present invention will be in detail given with reference to FIGS. 2 to 4.

Figure 2:
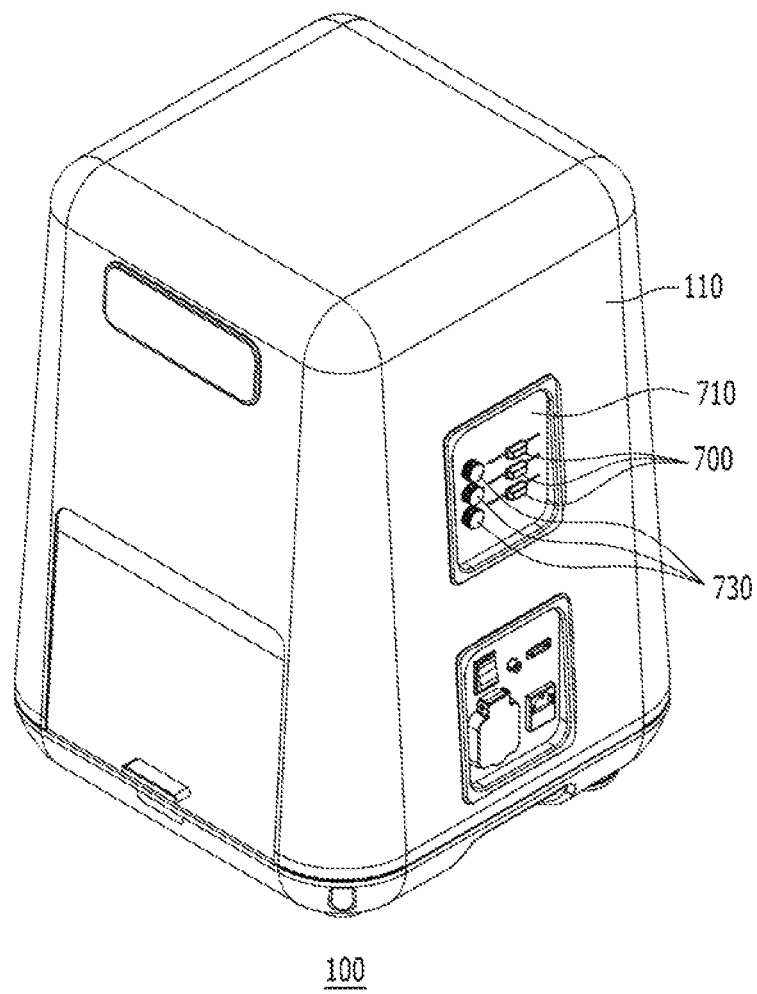
FIG. 2 is a perspective view showing a photographing apparatus having lens adjustment parts according to the present invention.
Figure 3:
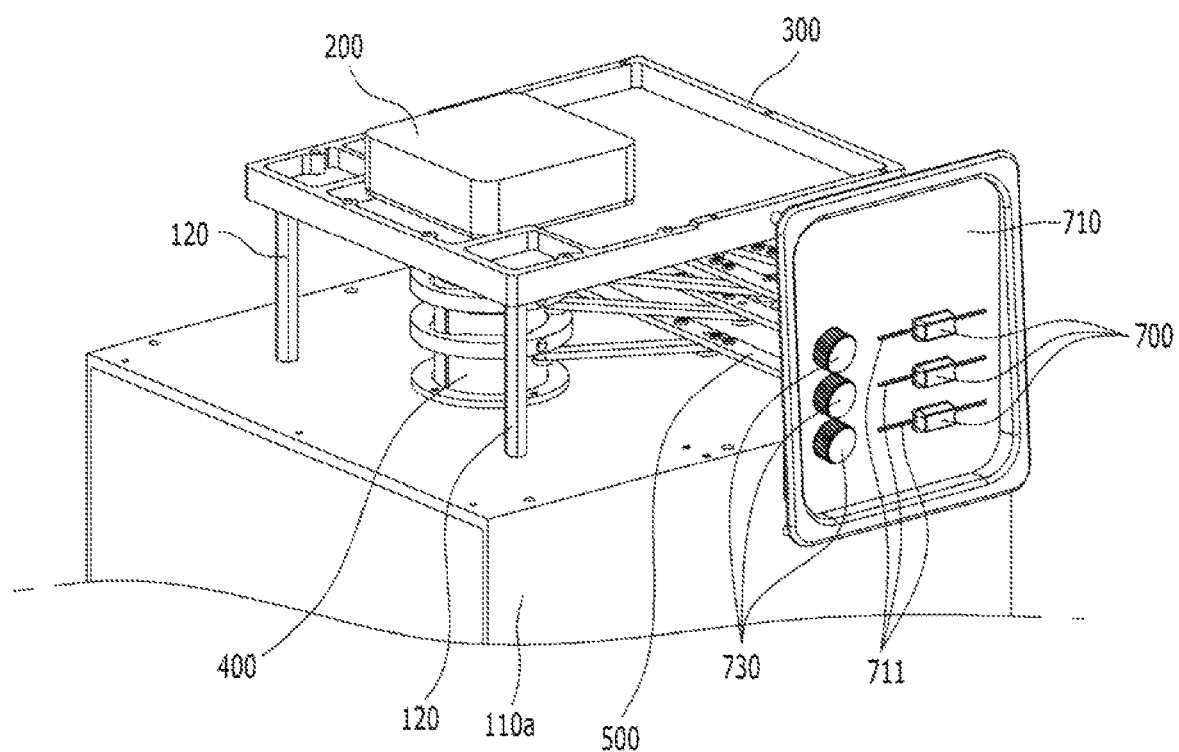
FIG. 3 is a perspective view showing the photographing apparatus having the lens adjustment parts according to the present invention, wherein a casing is removed to show relationships between a lens unit, link parts, and the lens adjustment parts.
Figure 4:
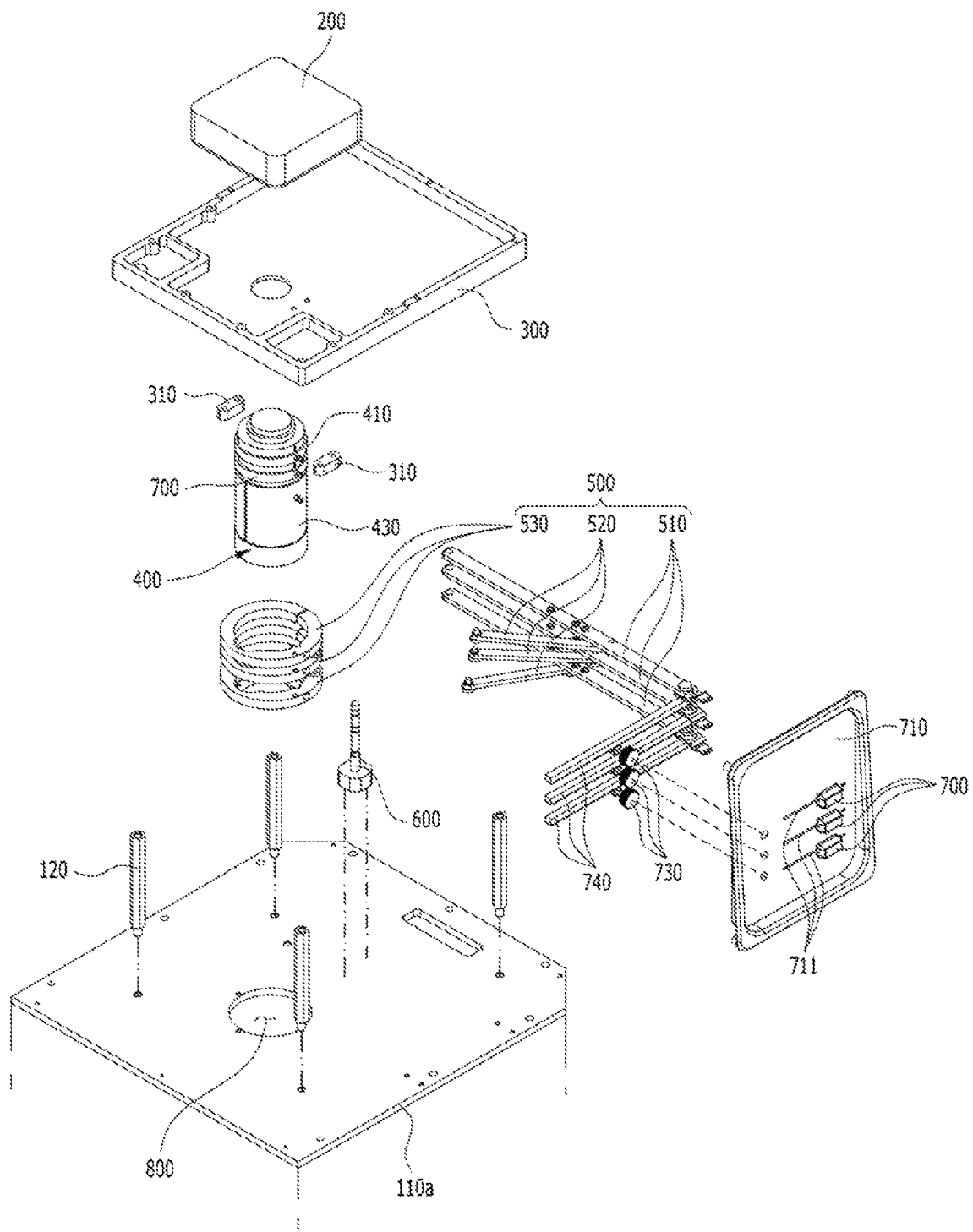
FIG. 4 is an exploded perspective view showing the photographing apparatus having the lens adjustment parts according to the present invention.

FIG. 2 is a perspective view showing a photographing apparatus having lens adjustment parts according to the present invention, FIG. 3 is a perspective view showing the photographing apparatus having the lens adjustment parts according to the present invention, wherein a casing is removed to show relationships between a lens unit, link parts, and the lens unit adjustment parts, and FIG. 4 is an exploded perspective view showing the photographing apparatus having the lens adjustment parts according to the present invention.

A photographing apparatus 100 having lens adjustment parts according to the present invention includes: a housing 110 in which an object to be photographed is located; a camera 200 located inside the housing 110 to photograph the object; a lens unit 400 fixed directly or indirectly to the camera 200 and having at least one lens knob 410; at least one link part 500 located inside the housing 110 and coupled to the lens knobs 410 to rotate the lens knobs 410; a fixing part 600 hingedly coupled to the link parts 500; and the lens adjustment parts 700 exposed to the outside of the housing 110 and coupled to one end of the link parts 500 in such a manner as to be linearly moved according to a user's adjustment, wherein the linear (horizontal) motions of the lens adjustment parts 700 through the user's adjustment can be converted into rotational motions of the lens knobs 410 by means of the link parts 500 coupled to the lens adjustment parts 700 and the lens knobs 410, so that only through the adjustment of the lens adjustment parts 700 in the horizontal directions, enlargement/reduction of the object and the adjustment of a focus and aperture of the lens unit 400 can be performed.

Now, the components of the photographing apparatus 100 according to the present invention will be in detail explained.

Within the housing 110, according to the present invention, a space in which the object to be photographed is located and a space in which the camera 200, the lens unit 400, the link parts 500, and the fixing part 600 are disposed are formed, without any division, but as shown in FIGS. 3 and 4, a casing 110a is disposed inside the housing 110 to provide a separate photographing space.

In detail, the object is located inside the casing 110a, and a space in which the camera 200 and the lens unit 400 are located is formed on the outside of the casing 110a, that is, on the top of the casing 110a. Further, a fixing plate 710 as will be discussed later is disposed on one surface of the housing 110 to fix the lens adjustment parts 700 thereto.

If the casing 110a is not separately located inside the housing 110, the fixing part 600 and support rods 120 for supporting a support plate 300 as will be discussed later are coupled to a top or side surface of the housing 110 to fix the link parts 500 and the support plate 300 thereto.

However, if the casing 110a is disposed inside the housing 110, as shown in FIGS. 3 and 4, the fixing part 600 and the support rods 120 are attached to the top of the casing 110a to fix the link parts 500 and the support plate 300 thereto.

If there is no separate casing 110a inside the housing 110, however, the components of the photographing apparatus may be freely arranged. Hereinafter, an explanation on the configuration of the photographing apparatus in which the casing 110a is located inside the housing 110 to cause the components to be limited in arrangement will be given.

First, the camera 200, which is located inside the housing 110 or above the casing 110a in such a manner as to be coupled directly or indirectly to the lens unit 400, serves to photograph the object like a laboratory rat located inside the housing 110 or the casing 110a, and according to the present invention, desirably, a CMOS (Complementary Metal Oxide Semiconductor) image sensor camera capable of providing a high quality of image is used as the camera 200.

In this case, the CMOS image sensor camera is just an example, and accordingly, a digital camera or CCD (Charge-Coupled Device) camera, which is generally used for molecular imaging, may be used as the camera 200.

At this time, the support plate 300 is located between the camera 200 and the lens unit 400. In detail, the support plate 300 is located on the underside of the camera 200 to support the camera 200 and the lens unit 400.

At this time, the support plate 300 is supported against the plurality of support rods 120 coupled to the top or side surface of the housing 110 or against the plurality of support rods 120 disposed on the top of the casing 110a if there is the casing 110a inside the housing 110, and the support plate 300 has a hole formed thereon to fix the lens unit 400, so that it can fix the lens unit 400 as well as the camera 200 thereto.

In detail, the lens unit 400 is coupled to the camera 200 located on top of the support plate 300 through the hole formed on the support plate 300, so that the top end portions of the lens unit 400 can be stably fixed to the support plate 300.

Figure 5:
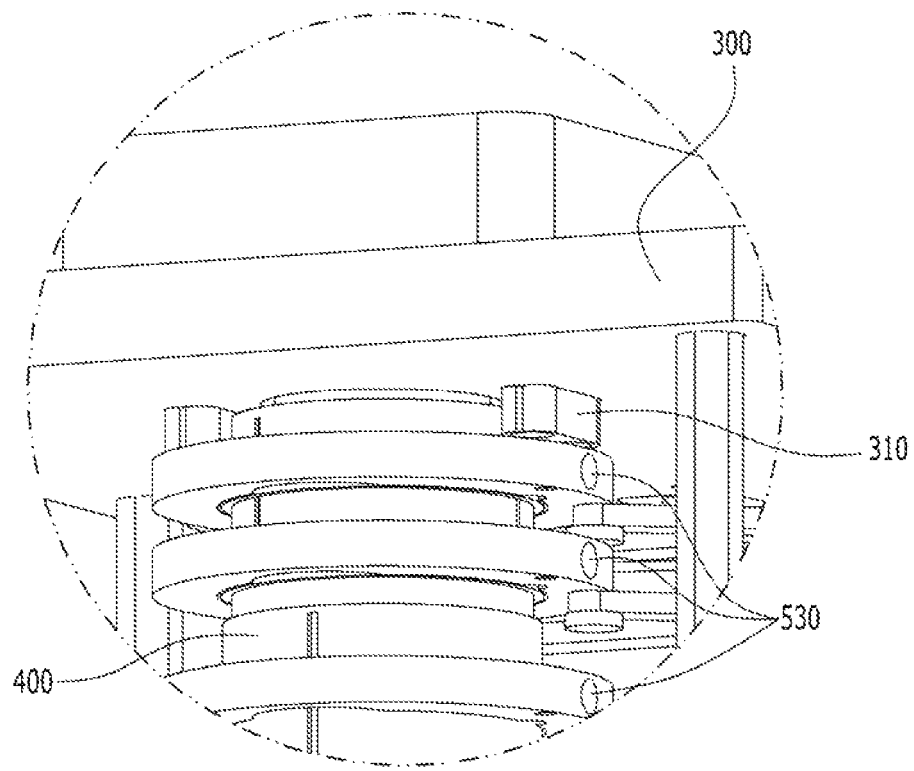
FIG. 5 is an enlarged view showing a state where the lens unit is fixed by means of fixing members in the photographing apparatus having the lens adjustment parts according to the present invention.
Figure 6:
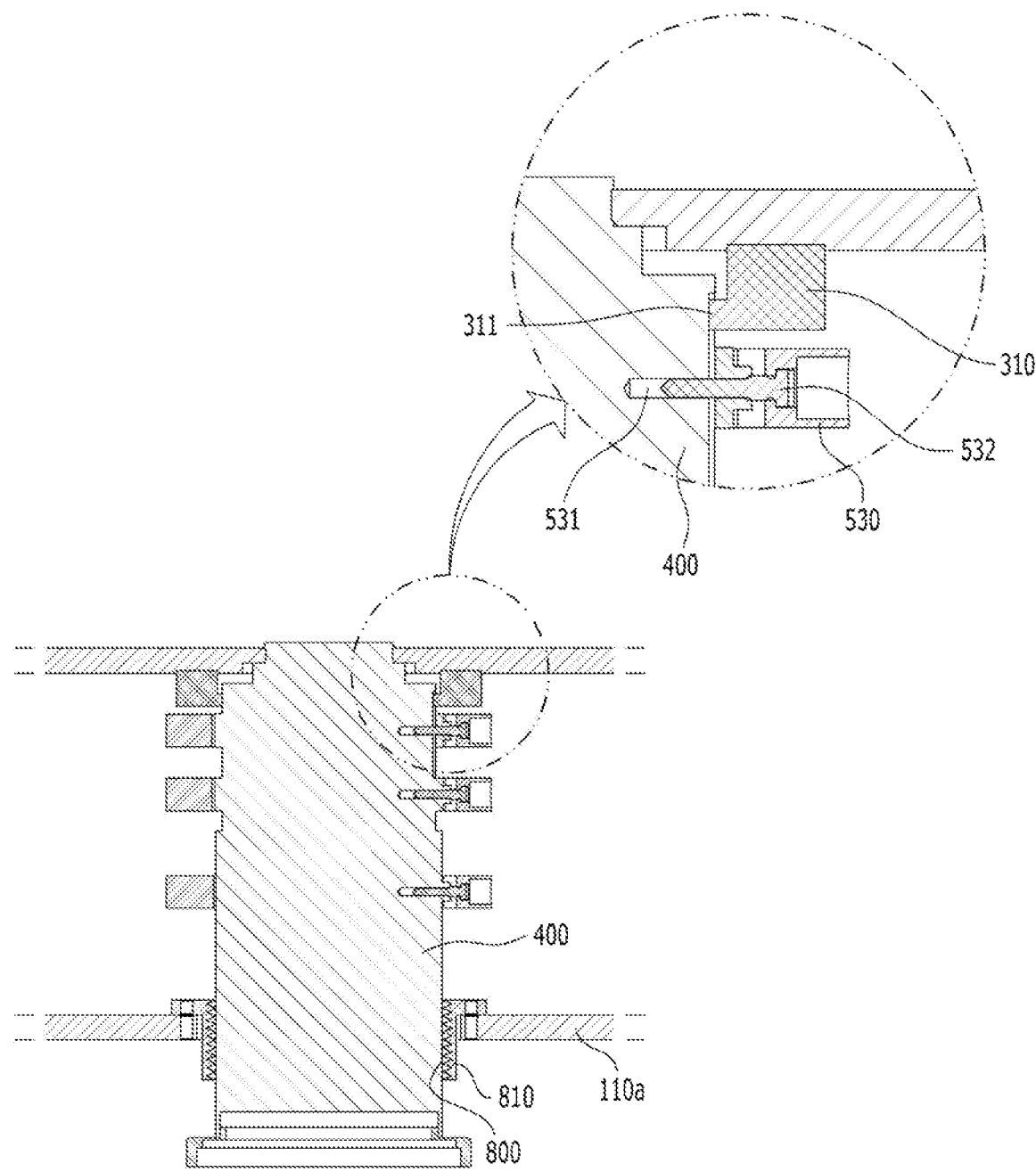
FIG. 6 is a sectional view showing a coupled state of the photographing apparatus having the lens adjustment parts according to the present invention.

Further, at least one fixing member 310 are disposed on the underside of the support plate 300 to allow the top end portions thereof to fix the lens unit 400 fixed to the support plate 300, and an explanation on the fixing members 310 will be in detail given with reference to FIGS. 5 and 6.

FIG. 5 is an enlarged view showing a state where the lens unit is fixed by means of the fixing members in the photographing apparatus having the lens adjustment parts according to the present invention, and FIG. 6 is a sectional view showing a coupled state of the photographing apparatus having the lens adjustment parts according to the present invention.

As mentioned above, each fixing member 310 located on the underside of the support plate 300 includes a protruding portion 311 protruding therefrom toward the lens unit 400 in such a manner as to be coupled to a groove formed on the top end portions of the lens unit 400 to prevent the lens unit 400 from being moved in left and right directions during photographing, thereby enhancing precision in the photographed image.

Of course, only one fixing member 310 can prevent the lens unit 400 from being moved, but as shown in FIGS. 5 and 6, two fixing members 310 can more stably prevent the movement of the lens unit 400. Further, of course, the movement of the lens unit 400 may be prevented by means of the two or more fixing members 310.

Next, the lens unit 400 is coupled to the camera 200 to focus an image so that the object can be photographed.

At this time, the lens unit 400 includes the plurality of lens knobs 410 capable of changing photographing states, and the lens knobs 410 serve to adjust a focus or aperture of the lens unit 400 or enlarge or reduce the object to be photographed.

So as to adjust the focus or aperture of the lens unit or to enlarge or reduce the object, at the time when an image is photographed through the conventional photographing apparatus, the lens knobs 410 have to be controlled directly by the user after the photographing apparatus has been open by him or her.

However, the photographing apparatus 100 according to the present invention is configured to allow the lens knobs 410 to be coupled to the link parts 500 and to allow the link parts 500 to be coupled to the lens adjustment parts 700 exposed to the outside of the housing 110.

If the lens adjustment parts 700 are adjusted by the user, external forces applied to the lens adjustment parts 700 are transferred to the lens knobs 410 through the link parts 500 coupled to the lens adjustment parts 700, so that unlike the conventional photographing apparatus, the lens knobs 410 are operated even if they are not controlled directly by the user, thereby adjusting the focus or aperture of the lens unit or enlarging/reducing the object to be photographed.

According to the present invention, for example, the lens unit 400 includes a first lens knob for adjusting a focus thereof, a second lens knob for adjusting an aperture thereof, and a third lens knob for enlarging/reducing the object (to be photographed).

The first lens knob is connected to the first lens adjustment part through the first link part, the second lens knob to the second lens adjustment part through the second link part, and the third lens knob to the third lens adjustment part through the third link part, so that only through the horizontal movements of the first lens adjustment part, the second lens adjustment part, and the third lens adjustment part, the focus of the lens unit can be adjusted, the aperture of the lens unit can be adjusted, and the object to be photographed can be enlarged/reduced.

According to the present invention, the lens unit 400 has the three lens knobs and there are the three link parts for connecting the lens knobs to the lens adjustment parts, which is just an example. Therefore, the number of lens knobs and the number of link parts may be of course adjustable, without being limited thereto.

Next, an explanation on the link parts 500 as the main components of the photographing apparatus 100 according to the present invention will be in detail given with reference to FIGS. 4 to 6.

The link parts 500 are coupled to the lens knobs 410 and the lens adjustment parts 700 to transfer the external forces applied to the lens adjustment parts 700 to the lens knobs 410, so that unlike the conventional photographing apparatus, the photographing apparatus 100 according to the present invention is capable of allowing the lens knobs 410 to be controlled indirectly through the lens adjustment parts 700.

So as to transfer the external forces applied to the lens adjustment parts 700 to the lens knobs 410, as shown in FIG. 6, each link part 500 includes: a ring like circular band 530 coupled to a coupling groove 531 formed on the corresponding lens knob 410 by means of a screw 532 in such a manner as to be rotated in a clockwise or counterclockwise direction together with the corresponding lens knob 410; a first link rod 510 whose one end is hingedly coupled to the fixing part 600 located on the top of the casing 110a (on the top or side of the housing 110 if there is no casing 110a inside the housing 110) and whose other end is coupled to the corresponding lens adjustment part 700 in such a manner as to be rotated in the clockwise or counterclockwise direction with respect to the fixing part 600 if the corresponding lens adjustment part 700 is horizontally moved; and a second link rod 520 whose one end is coupled to the top or underside of the ring 530 and whose other end is coupled to the first link rod 510 in such a manner as to be rotated together the first link rod 510.

At this time, the lens adjustment parts 700 are fixed by means of the fixing plate 710 located on the outer surface of the housing 110, and the fixing plate 710 has moving slots 711 formed to a given length in a horizontal direction, so that the lens adjustment parts 700 can be linearly (horizontally) moved along the moving slots 711 to the left or right sides.

Further, each lens adjustment part 700 has a bracket 720 so that it can be coupled to one end of the first link rod 510 through the bracket 720, and the bracket 720 serves to convert the horizontal motion of each lens adjustment part 700 through the user's adjustment into the rotational motion of the first link rod 510.

Moreover, as shown in FIGS. 2 to 4, the photographing apparatus 100 according to the present invention further includes fine knobs 730 capable of more precisely adjusting the lens knobs 410.

Like the lens adjustment parts 700, the fine knobs 730 are fixed to the fixing plate 710 and have pinion gears coupled to their ends not exposed to the outside of the housing 110.

Further, rack gears 740 corresponding to the pinion gears coupled to the fine knobs 730 are attached to tops or undersides of the ends (coupled to the lens adjustment parts 700) of the first link rods 510, so that if the fine knobs 730 are rotated in the clockwise or counterclockwise direction by means of the user's adjustment, the pinion gears of the fine knobs 730 are rotated, and accordingly, the rack gears 740 coupled to the first link rods 510 are linearly (horizontally) moved to allow the first link rods 510 to be rotated with respect to the fixing part 600, like the link adjustment parts 700.

In case where the lens adjustment parts 700 are moved to the left and right sides through the user's adjustment, it is difficult to control their displacement quantity, so that it is hard to finely adjust the lens knobs 410, thereby failing to precisely control the focus and aperture of the lens unit 400. According to the present invention, however, there are the fine knobs 730 capable of adjusting the motions of the link parts 500 through their rotation, thereby allowing the lens unit 400 to be more precisely controlled.

In detail, the photographing apparatus 100 according to the present invention includes a first fine knob for finely adjusting the first lens knob, a second fine knob for finely adjusting the second lens knob, and a third fine knob for finely adjusting the third lens knob, and in addition to the first to third lens adjustment parts, the first to third fine knobs are adjusted to allow the adjustment for the focus and aperture of the lens unit 400 and the enlargement/reduction of the object to be carried out more precisely.

At this time, the pinion gear is coupled to the end of each fine knob 730, and the rack gear 740 is coupled to the first link rod 510, so that the rotation of the fine knob 730 is converted into the rotation of the first link rod 510, which is just an embodiment of the preset invention. Only if the rotation of the fine knob 730 is converted into the rotation of the first link rod 510, of course, another coupling way may be adopted.

Next, an explanation on processes of operating the link parts 500 and the lens unit 400 through the adjustment of the lens adjustment parts 700 will be given with reference to FIGS. 7A and 7B.

Figure 7A:
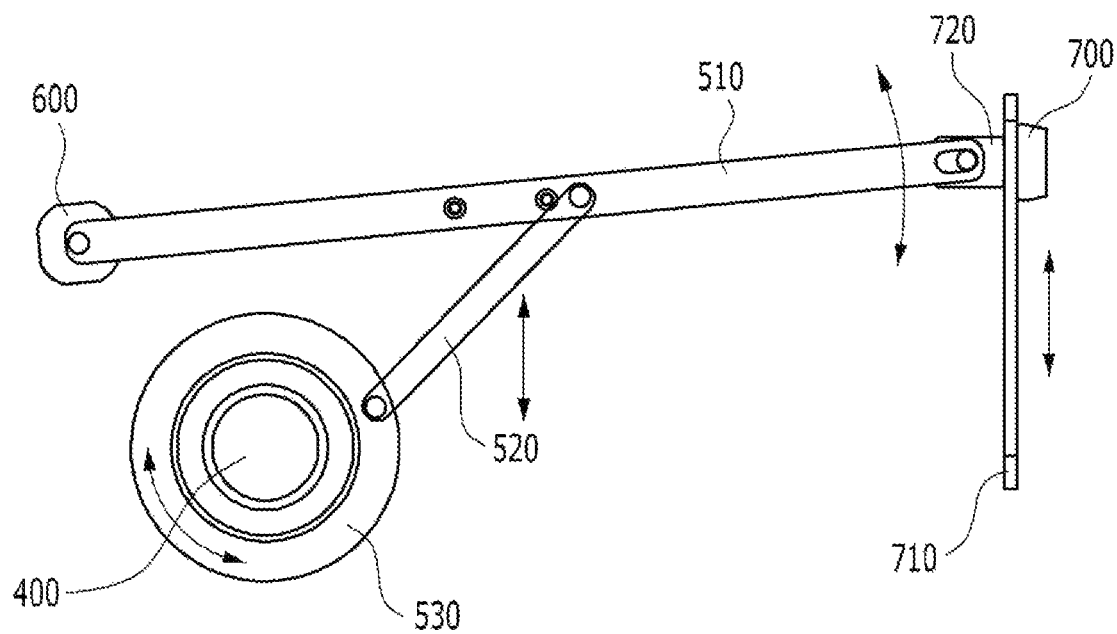
FIGS. 7A and 7B are side views showing processes in which the lens unit is operated through the adjustment of the lens adjustment parts in the photographing apparatus having the lens adjustment parts according to the present invention.
Figure 7B:
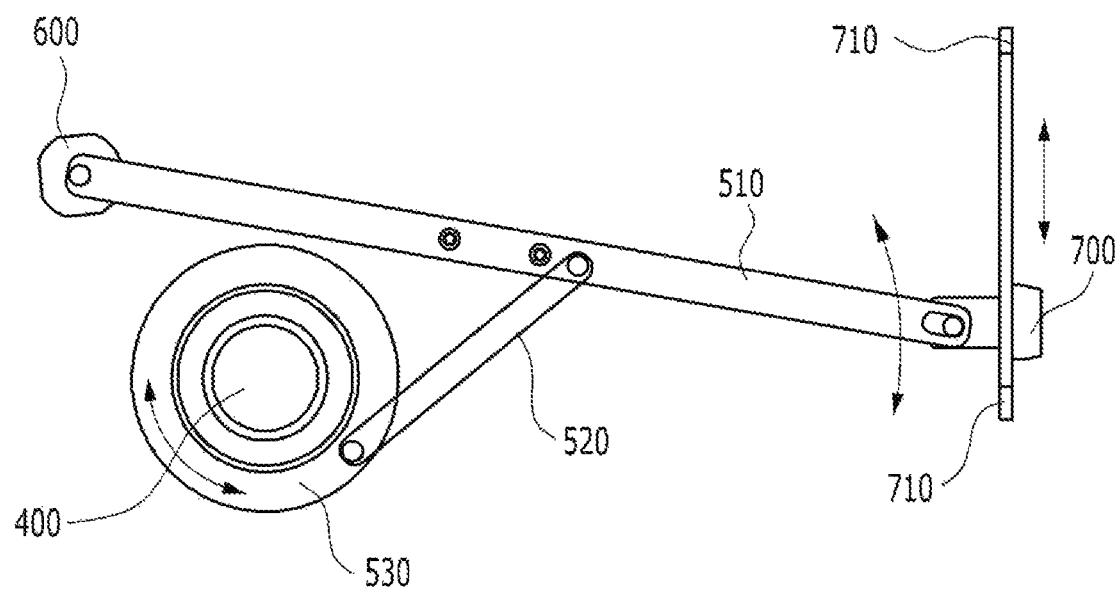

FIGS. 7A and 7B are side views showing processes in which the lens unit is operated through the adjustment of the lens adjustment parts in the photographing apparatus having the lens adjustment parts according to the present invention.

In a state where one lens adjustment part 700 is located at the right side of the fixing plate 710, as shown in FIG. 7A, if the lens adjustment part 700 is adjusted by the user and is thus located horizontally to the left side of the fixing plate 710, as shown in FIG. 7B, the first link rod 510 whose one end is hingedly coupled to the fixing part 600 and whose other end is coupled to the bracket 720 of the lens adjustment part 700 is rotated in the clockwise direction with respect to the fixing part 600 when viewed on top thereof.

If the first link rod 510 is rotated in the clockwise direction, the second link rod 520 whose one end is coupled to the first link rod is rotated together with the first link rod 510, and through the rotation of the second link rod 520, the ring 530 coupled to the second link rod 520 is also rotated in the clockwise direction.

Contrarily, if the lens adjustment part 700 is moved horizontally from the left side of the fixing plate 710 to the right side thereof, the first link rod 510 is rotated in the counterclockwise direction with respect to the fixing part 600, and through the rotation of the first link rod 510 in the counterclockwise direction, the second link rod 520 is rotated together with the first link rod 510, so that the ring 530 is also rotated in the counterclockwise direction.

Like this, if the ring 530 is rotated in the clockwise or counterclockwise direction according to the movement of the corresponding lens adjustment part 700, the lens knob 410 coupled to the ring 530 by means of the screw 532 is also rotated, so that if the lens knob 410 for adjusting the focus of the lens unit 400 is rotated through the adjustment of the lens adjustment part 700, a position at which the focus of the lens unit 400 is formed can be changed, if the lens knob 410 for adjusting the aperture of the lens unit 400 is rotated, a quantity of light can be adjusted, and the lens knob 410 for enlarging or reducing the object is rotated, an image where the object is more enlarged or reduced than the existing image can be obtained.

In detail, the photographing apparatus 100 according to the present invention is capable of adjusting the lens knobs 410 through the link parts 500 each having the first link rod 510, the second link rod 520, and the ring 530 only if the lens adjustment parts 700 are moved linearly, which is completely different from the conventional photographing apparatus, and further, the lens knobs 410 can be more finely adjusted through the adjustment of the lens adjustment parts 700 than they are adjusted by the user's hands, thereby enhancing the precision in the photographed image of the object.

Further, each lens knob 410 and the ring 530 are coupled to each other by means of the screw 532, which is just an example, and therefore, only if they may be coupled to each other, another means may be adopted.

Figure 8:
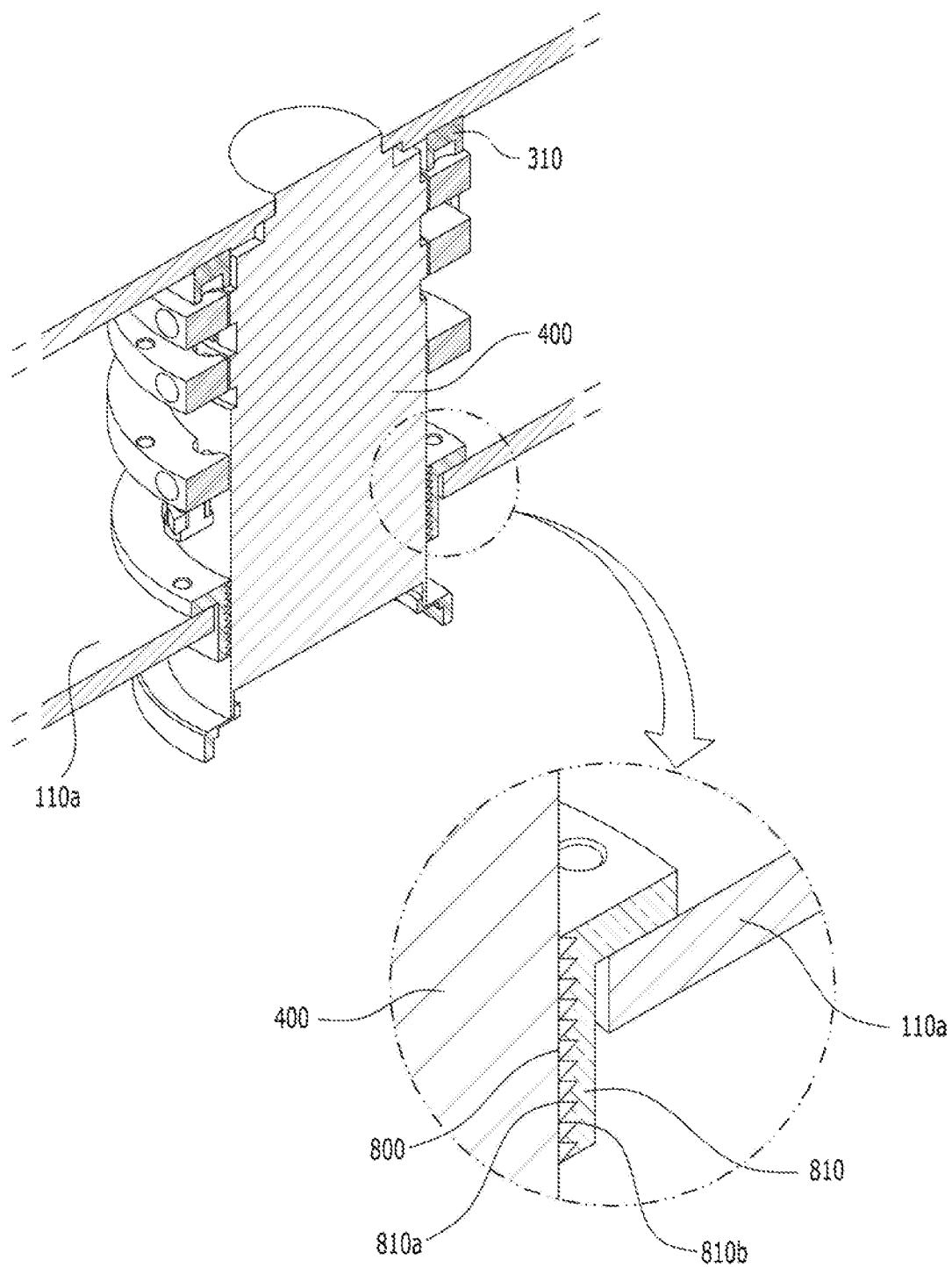
FIG. 8 is a sectional view showing a blocking member disposed on a lens unit insertion hole in the photographing apparatus having the lens adjustment parts according to the present invention.

Lastly, an explanation on a blocking member 810 for enhancing the precision of the photographed image in the photographing apparatus 100 according to the present invention will be in detail given with reference to FIG. 8.

FIG. 8 is a sectional view showing a blocking member disposed on a lens unit insertion hole in the photographing apparatus according to the present invention.

As mentioned above, the photographing apparatus 100 according to the present invention includes the housing 110 for protecting the camera 200, the lens unit 400, and so on, and in some cases, the photographing apparatus 100 includes a casing 110a disposed inside the housing 110 and having a closed space formed at the inside thereof to allow a stage on which the object to be photographed is placed and a light source for irradiating light to be disposed in the closed space thereof, and the camera 200, the lens unit 400 and the link parts 500 disposed in the space above the casing 110a.

However, the photographing apparatus 100 according to the present invention has technical characteristics in that the lens knobs 410 are controlled through the lens adjustment parts 700, and therefore, a detailed explanation on the components disposed inside the closed casing 110a will be avoided below.

If the casing 110a is disposed inside the housing 110, a lens unit insertion hole 800 having a larger diameter than the lens unit 400 is formed on the top of the casing 110a, and the lens unit 400 is inserted into the casing 110a through a lens unit insertion hole 800, in order to photograph the object placed inside the casing 110a.

A blocking member 810 is disposed along the inner peripheral surface of the lens unit insertion hole 800 to prevent an external light source from being introduced in the casing 110, thereby enhancing the precision in the photographed image.

In detail, the blocking member 810 serves to block out the external light, together with the housing 110 located above the casing 110a and the casing 110a, as shown in FIG. 3, and the photographing apparatus 100 according to the present invention primarily protects the introduction of the external light source through the housing 110 and the casing 110a and secondarily blocks out the external light source not protected by means of the housing 110 and the casing 110a through the blocking member 810, thereby minimizing the influences of the external light source in the process of obtaining the image through the camera 200 and improving the precision in the photographed image.

At this time, the blocking member 810 protrudes from a top inner peripheral surface thereof toward the center of the lens unit insertion hole 800, and as shown in FIG. 8, the end periphery of the blocking member 810 comes into contact with the outer peripheral surface of the lens unit 400 to block out the space through which the external light source is introduced in the closed casing 110a, so that the introduction of the external light source is prevented.

Moreover, as shown in FIG. 8, the blocking member 810 has a shape of a section having crests 810a and roots 810b alternately arranged, and the crests 810a of the blocking member 810 come into contact with the outer peripheral surface of the lens unit 400 to block out the space through which the external light source is introduced.

Like this, the section of the blocking member 810 has the crests 810a and the roots 810b alternately arranged, and accordingly, even if a portion of the external light source is introduced in the lens unit insertion hole 800, it is caught in the spaces between the crests 810a and the roots 810b, thereby more effectively blocking out the external light source.

However, the protruding shape of the blocking member 810 as shown in FIG. 8 is just an example of the present invention, and therefore, of course, the section of the blocking member 810 may have a shape of "f" or a concave-convex shape so as to block out the external light source.

Under the above-mentioned configuration, the photographing apparatus 100 according to the present invention is capable of adjusting the focus and aperture of the lens unit and enlarging and reducing the object to be photographed just through the adjustment of the lens adjustment parts, thereby giving many conveniences in controlling the lens unit to the user.

Further, the photographing apparatus 100 according to the present invention is capable of adjusting the state of the lens unit, while the interior of the apparatus is being not open or the lens unit protrudingly exposed to the outside thereof is being not directly adjusted, so that unlike the conventional practices, the lens unit can be adjusted, without any stopping during the photographing, thereby allowing the state of the lens unit to be more precisely adjusted by the user to thus enhance the precision in the photographed image.

As set forth in the foregoing, the photographing apparatus according to the present invention is capable of enlarging and reducing the object or adjusting the focus and aperture of the lens unit, unlike the conventional practices wherein the lens unit protrudingly exposed to the outside thereof is directly adjusted or the heights of the camera and stage are adjusted through the electric motor, thereby providing many conveniences for the user and minimizing the damage on the lens unit.

In addition, the photographing apparatus according to the present invention is capable of finely adjusting the lens unit in real time during the photographing process, thereby obtaining more precise molecular imaging than that in the conventional practices.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

Terms used in this application are used to only describe specific exemplary embodiments and are not intended to restrict the present invention. An expression referencing a singular value additionally refers to a corresponding expression of the plural number, unless explicitly limited otherwise by the context.

It is therefore intended that the scope of the invention be limited not by this detailed description, but rather by the claims appended hereto.

What is claimed is:

1. A photographing apparatus having lens adjustment parts, comprising:
   a housing in which an object to be photographed is located;
   a camera located inside the housing to photograph the object;
   a lens unit having at least one lens knob;
   at least one link part located inside the housing and coupled to the lens knobs to rotate the lens knobs;
   a fixing part hingedly coupled to the link parts; and
   the lens adjustment parts coupled to one end of the link parts in such a manner as to be linearly moved according to a user's adjustment,
   wherein the linear motions of the lens adjustment parts are converted into rotational motions of the lens knobs by means of the link parts coupled to the lens adjustment parts and the lens knobs.

2. The photographing apparatus according to claim 1, further comprising a casing disposed inside the housing to provide an object photographing space therein.

3. The photographing apparatus according to claim 1, further comprising a support plate located on the underside of the camera to support the camera.

4. The photographing apparatus according to claim 1, wherein the lens unit comprises:
   the first lens knob for adjusting a focus;
   the second lens knob for adjusting an aperture; and
   the third lens knob for enlarging/reducing the object.

5. The photographing apparatus according to claim 4, further comprising:
   a first fine knob for finely adjusting the first lens knob;
   a second fine knob for finely adjusting the second lens knob; and
   a third fine knob for finely adjusting the third lens knob.

6. The photographing apparatus according to claim 4, wherein the link parts comprise:
   the first link part coupled to the first lens knob;
   the second link part coupled to the second lens knob; and
   the third link part coupled to the third lens knob.

7. The photographing apparatus according to claim 1, wherein each link part comprises:
   a ring coupled to the corresponding lens knob;
   a first link rod whose one end is hingedly coupled to the fixing part and whose other end is coupled to the corresponding lens adjustment part; and
   a second link rod whose one end is coupled to the ring and whose other end is coupled to the first link rod.

8. The photographing apparatus according to claim 7, wherein each lens adjustment part further comprises a bracket coupled to the first link rod in such a manner as to convert the horizontal motion of each lens adjustment part into a rotational motion of the first link rod.

9. The photographing apparatus according to claim 7, wherein the first link rod is rotated through the horizontal motion of each lens adjustment part, and through the rotation of the first link rod, the second link rod is rotated to rotate the ring, so that through the rotation of the ring, the corresponding lens knob is rotated.

10. The photographing apparatus according to claim 3, further comprising at least one fixing member disposed on the underside of the support plate to fix the lens unit.

11. The photographing apparatus according to claim 10, wherein each fixing member comprises a protruding portion protruding therefrom toward the lens unit to prevent the lens unit from being moved.

12. The photographing apparatus according to claim 3, further comprising a plurality of support rods for supporting the support plate.

13. The photographing apparatus according to claim 2, further comprising a blocking member disposed on an inner peripheral surface of a lens unit insertion hole formed on the top of the casing to block out an external light source.

14. The photographing apparatus according to claim 13, wherein the blocking member has a shape of a section having crests and roots alternately arranged.

* * * * *